(12) United States Patent
Hildebrand et al.

(10) Patent No.: US 6,418,316 B2
(45) Date of Patent: *Jul. 9, 2002

(54) INCREASING CHANNEL CAPACITY OF WIRELESS LOCAL LOOP VIA POLARIZATION DIVERSITY ANTENNA DISTRIBUTION SCHEME

(75) Inventors: Robert C. Hildebrand, Indialantic, FL (US); James H. Chinnick, Alberta (CA)

(73) Assignee: Harris Corporation, Melbourne, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,050

(22) Filed: Aug. 6, 1998

(51) Int. Cl.$^7$ ................................. H04Q 7/20
(52) U.S. Cl. ................ 455/447; 455/446; 455/450; 370/203
(58) Field of Search ................ 455/403, 450, 455/455, 463, 509, 452, 446–449, 562, 103; 379/272, 273; 370/325, 203, 347, 330

(56) References Cited

U.S. PATENT DOCUMENTS

| | | | |
|---|---|---|---|
| 5,038,399 A | 8/1991 | Bruckert | 455/33 |
| 5,093,925 A | 3/1992 | Chanroo | 455/33 |
| 5,247,699 A | 9/1993 | Hartman | 455/33.1 |
| 5,442,663 A | 8/1995 | Andersen et al. | 375/229 |
| 5,448,750 A | 9/1995 | Eriksson et al. | 455/33.1 |
| 5,483,667 A | 1/1996 | Faruque | 455/33.1 |
| 5,533,027 A | 7/1996 | Akerberg et al. | 370/347 |
| 5,631,898 A | 5/1997 | Dent | 370/203 |
| 5,640,674 A | 6/1997 | Dixon | 455/33.1 |
| 5,649,292 A | 7/1997 | Doner | 455/447 |
| 5,666,649 A | 9/1997 | Dent | 455/445 |
| 5,701,584 A | 12/1997 | Dupuy | 455/33.1 |
| 5,930,248 A | 7/1999 | Langlet et al. | 370/347 |
| 5,933,421 A | 8/1999 | Alamouti et al. | 370/330 |
| 5,949,793 A | 9/1999 | Bossard et al. | 370/487 |
| 5,991,630 A | 11/1999 | Charas | 455/452 |
| 6,032,034 A | 2/2000 | Rabina et al. | 455/401 |
| 6,035,219 A * | 3/2000 | Brodie | 455/562 |
| 6,167,286 A * | 12/2000 | Ward et al. | 455/562 |
| 6,175,747 B1 * | 1/2001 | Tanishima et al. | 455/562 |

* cited by examiner

Primary Examiner—Dwayne Bost
Assistant Examiner—Sonny Trinh
(74) Attorney, Agent, or Firm—Allen, Dyer, Doppelt, Milbrath & Gilchrist, P.A.

(57) ABSTRACT

In order to increase the channel capacity of a wireless local loop network, advantage is taken of the fixed location of each subscriber radio, and the ability to independently configure each subscriber's antenna, to provide antenna cross polarization isolation into the cellular layout of the WLL network, and thereby provide an additional layer of interference rejection. Such a cross polarization assignment scheme, in combination with frequency reuse allocation, provides a substantial increase in the C/I ratio and thereby allows an expansion of the reuse of frequency channels.

8 Claims, 2 Drawing Sheets

F2 – F4:
CHANNEL
FREQUENCY
SETS

V V V V V V V V — 41
H H H H H H H — 42
V V V V V V V V — 43
H H H H H H H — 44

| CROSS Pol LOSS(dB) | C/I (dB) | C/I IMPROVEMENT (dB) |
|---|---|---|
| INFINITE | 10.9 | 4.8 |
| 20 | 10.8 | 4.7 |
| 10 | 10.1 | 4.0 |
| 5 | 8.76 | 2.66 |
| 3 | 7.89 | 1.79 |
| 0 | 6.1 | 0 |

INCREASING CHANNEL CAPACITY OF WIRELESS LOCAL LOOP VIA POLARIZATION DIVERSITY ANTENNA DISTRIBUTION SCHEME

FIELD OF THE INVENTION

The present invention relates in general to communication systems, and is particularly directed to a scheme for increasing the channel capacity of a wireless local loop (WLL) network by means of a prescribed polarization diversity antenna assignment scheme among geographical cells of the WLL communication network.

BACKGROUND OF THE INVENTION

As the communications industry continues to expand into what were previously remote and/or less technologically developed regions of the world, it faces the absence of an existing communication (e.g., copper wire, fiber optic link) cable infrastructure with which to connect its equipment. Because the cost and time to install such an infrastructure in these regions is prohibitive, communication service providers have turned to the use of radio-based system, known as wireless local loop (WLL) networks.

As diagrammatically illustrated in FIG. 1, in a wireless local loop, customer premises equipments are typically comprised of one or more telephones (e.g., handsets) 10, that are coupled to a wireless transceiver (e.g, radio) 11 installed within a building 13 (such as a business or home), and having an associated fixed (e.g., roof-mounted) antenna 15. As shown in FIG. 2, these customer premises equipments are located at a number of fixed sites 17 that are geographically dispersed relative to a base station 20, where radio transceiver equipment of the WLL service provider for the geographic cell of interest is located. The WLL base station 20, in turn, is coupled to rout customer calls through a public telephone switch network (PTSN), so that each WLL network customer of the cell may enjoy the same services provided by a wireline-based telco subscriber.

FIG. 3 diagrammatically illustrates a typical layout of a large area WLL multicell structure. The darkened cells have the same channel frequency allocations in accordance with a frequency reuse factor of four. Cells B1–B6 are cells reusing the same frequencies as cell A, and their separation from cell A in a conventional system determines the carrier to interference ratio (C/I), all other parameters being equal.

However, unlike a standard mobile customer-based cellular telephone system, where subscriber transceivers are relatively low power and employ (gain-limited) omnidirectional antennas, the geographical locations of the radios of a wireless local loop are fixed, which allows the WLL customer radio site to employ an antenna having a focussed directivity pattern (namely one providing gain toward the base station of that cell). While this facilitates communications for a geographically large WLL cell, there still remains the fact that frequency channels are a precious resource, and their reallocation is governed by the allowable carrier to interference ratio.

SUMMARY OF THE INVENTION

In accordance with the present invention, advantage is taken of the fixed location of each subscriber's radio, and the ability to independently configure each subscriber's antenna, so as to incorporate communication signalling or antenna polarization diversity into the cellular layout of the WLL network, and thereby provide an additional layer of interference rejection. Such a cross or orthogonal polarization assignment scheme, in combination with frequency reuse allocation, provides a substantial increase in the C/I ratio and thereby allows an expansion of the reuse of frequency channels.

For this purpose, in a non-limiting example of the polarization diversity mechanism of the present invention, cells of a given row of a cell cluster are assigned a first communication signal or antenna polarization, such as vertical or right hand circular polarization, as non-limiting examples, while cells of adjacent rows are assigned a second communication signal polarization, such as horizontal or left hand circular polarization, as non-limiting examples, the second polarization being 'orthogonal' to the first polarization for maximum polarization isolation. All the cells of any given row employ the same polarization. Such a cross polarization assignment scheme allows cells in adjacent rows to employ identical channels without exceeding the established carrier to interference ratio (C/I). For any given cell, only two adjacent cells have the same polarization as the cell of interest, while the remaining four adjacent cells have the opposite polarization, so that cross polarization isolation is maximized.

When such an interleaved row cross or orthogonal polarization scheme is applied to a hexagonal cluster diagram employing a frequency reuse factor of four, an increase in interference rejection is provided by a cross polarization isolation of 10 dB between a given horizontally polarized base station antenna, and vertically polarized antennas employed in cells of rows on either side of the row containing the base station of interest.

Actual orthogonal polarization isolation will vary as a function of the RF channel and may be maximally established at the time the WLL network is initially configured. For such a cell cluster having a frequency reuse allocation of four, if orthogonal or cross polarization isolation were infinite, the resultant C/I would provide a 4.8 dB improvement over a network not using polarization diversity.

If the orthogonal polarization isolation is only 10 dB, however, the C/I improvement still enjoys a substantial improvement of 4.0 dB. Additional improvement can be obtained by installing subscriber antenna with directional gain. In general, a base station cannot employ directional antennas, but instead uses a single omnidirectional antenna having a polarization dictated by the designed polarization diversity scheme.

DETAILED DESCRIPTION

Figure 1:
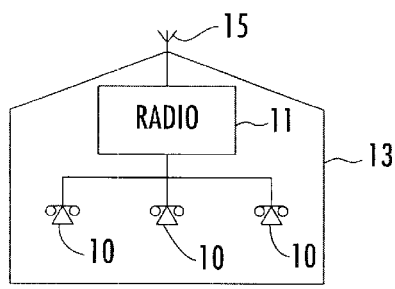
FIG. 1 is a simplified diagram of customer premises equipment for a wireless local loop.
Figure 2:
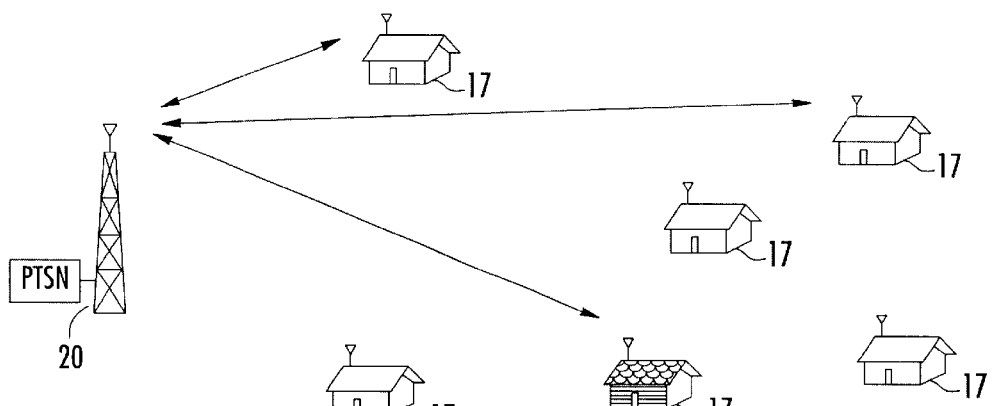
FIG. 2 is a simplified diagram of a wireless local loop serving the customer premises of FIG. 1.

Before describing in detail the scheme for increasing the channel capacity of a wireless local loop (WLL) in accordance with the present invention, it should be observed that the invention resides primarily in what is effectively a prescribed arrangement of conventional communication circuits and associated components. Consequently, the configuration of such circuits and components and the manner in which they are interfaced with other communication network equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and associated cell layouts described herein are primarily intended to show the major components of a wireless local loop network in a convenient functional grouping and processing sequence, whereby the present invention may be more readily understood.

As pointed out briefly above, the present invention takes advantage of the fixed location of each subscriber's radio, and the ability to independently configure each radio antenna, so as to incorporate antenna polarization diversity into the cellular layout of the WLL network, and thereby provide an additional layer of interference rejection. When integrated with frequency reuse allocation, such antenna polarization diversity allows an increase in the frequency channel reuse.

Figures 4, 5, 6:
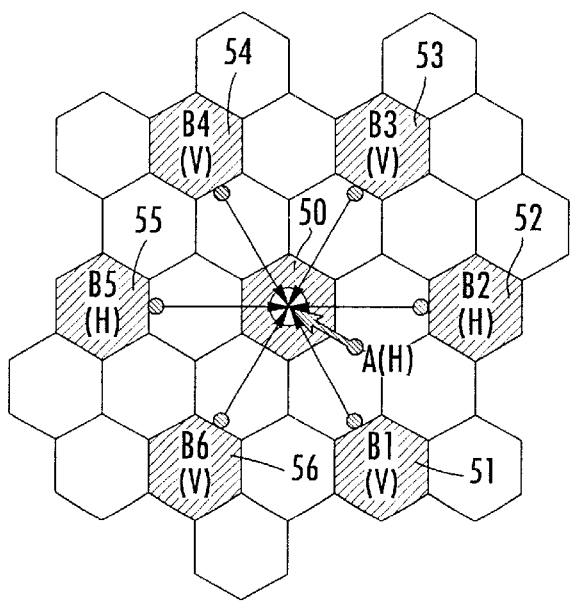
FIG. 4 diagrammatically illustrates the manner in which a horizontal—vertical polarization diversity assignment scheme may be incorporated into a wireless local loop cellular cluster.
FIG. 5 diagrammatically illustrates the application of the polarization diversity layout of FIG. 4 to the cluster diagram of FIG. 3.
FIG. 6 is a Table showing the relationship between cross polarization isolation for four adjacent cells and the resultant C/I for the cluster of FIG. 5.

The manner in which the polarization diversity mechanism of the present invention may be incorporated into wireless local loop cellular cluster is diagrammatically illustrated in FIG. 4. As shown therein, cells of a given row, such as rows 41 and 43, employ a first communication signal or antenna polarization (e.g., vertical (V) polarization), which is orthogonal to a second communication signal or antenna polarization (e.g., horizontal (H) polarization) of an adjacent row, such as rows 42 and 44. Cells of the same row employ the same polarization. From a practical implementation standpoint for the non-limiting case of linear polarization, providing cross or orthogonal polarization diversity is readily accomplished with the same antenna hardware being installed at each site, but with a 90° rotation of antennal elements between sites of orthogonal polarization.

The orthogonal or cross polarization assignment scheme described above allows cells in adjacent rows to employ identical channels without exceeding the established carrier to interference ratio (C/I). In the cell cluster example of FIG. 4, for any given cell, only two adjacent cells have the same polarization as the cell of interest, while the remaining four adjacent cells have the opposite polarization, so that cross polarization isolation is maximized for the hexagonal geometry cluster.

Figure 3:
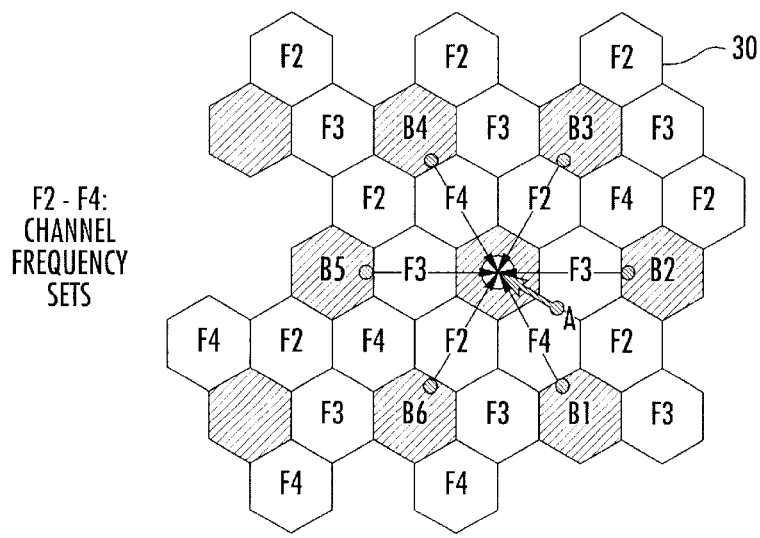
FIG. 3 shows an example of a geographically distributed WLL network having a frequency reuse (factor of four) allocation scheme for a geographically defined cluster of basestation cells.

FIG. 5 diagrammatically illustrates the application of the polarization diversity layout of FIG. 4 to the cluster diagram of FIG. 3, with a frequency reuse factor of four. As shown therein, for the case of using linear polarization antenna components, an increase in interference rejection is provided by a cross or orthogonal polarization isolation of 10 dB between a horizontally polarized base station antenna in the center cell 50 (A), and vertically polarized antennas employed by WLL user equipments (B1, B3, B4, B6) in cells 51, 53, 54 and 56, which are disposed in cell rows adjacent to the 'horizontally polarized' row of cells containing cell 50 and cells 52 and 55 (wherein WLL user equipments B2 and B5 are located). As noted above, the actual cross polarization isolation will vary as a function of the RF channel and are maximally established at the time the network is initially configured.

Were orthogonal polarization isolation perfect (infinite), the resultant C/I would be 10.9 dB, as listed in the Table of FIG. 6, which shows the relationship between cross polarization isolation for four adjacent cells and the resultant C/I for the cluster of FIG. 5, with a frequency reuse of four. It should be noted that installing a subscriber antenna with directional gain will provide further improvement. However, in general, the base station cannot employ a plurality of directional antennas, but rather uses a single omnidirectional antenna having a polarization dictated by the designed polarization diversity scheme, such as that shown in FIGS. 4 and 5, described above.

As will be appreciated from the foregoing description, by taking advantage of the fixed location of each subscriber radio, and the ability to independently configure each subscriber's antenna, the present invention is able to incorporate communication signalling or antenna cross (orthogonal) polarization isolation into the cellular layout of the WLL network, and thereby provide an additional layer of interference rejection. Such a cross polarization assignment scheme, in combination with frequency reuse allocation, provides a substantial increase in the C/I ratio and thereby allows an expansion of the reuse of frequency channels.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

For example, although orthogonal linear polarization components have been referenced for purposes of providing a non-limiting example, it should be realized that the invention is equivalently applicable to other polarization diversity arrangements, such as, but not limited to right and left hand circular polarization or orthogonal elliptical polarization.

What is claimed is:

1. A method of configuring a communication network comprising the steps of:

(a) providing a wireless local loop network having an arrangement of cells, each of which contains a base station, an omnidirectional antenna, and wireless transceiver equipment operative with a multiple frequency reuse factor, and that serves a plurality of fixed customer wireless transceiver sites, said fixed customer wireless transceiver sites being geographically dispersed relative to said base station and communicating with said base station using a prescribed communication signal polarization therebetween, said base station being arranged to interface customer calls with a public telephone switch network (PTSN); and (b) assigning communication frequency reuse and communication signal polarization diversity among respective cells of said network, so as to satisfy a prescribed carrier to interference ratio (C/I) criterion by employing antennas in non-contiguous cells of only a first vertical polarization for wireless communications between base stations and customer wireless transceiver sites in first selected rows of said cells and employing antennas in non-contiguous cells of only a second horizontal polarization for wireless communications between base stations and customer wireless transceiver sites in second selected rows of said cells, between said first rows of said cells, wherein said first and second selected rows of cells have the same channel frequency allocation and are separated by a row of cells having a different channel frequency allocation.

2. A method according to claim 1, wherein step (b) comprises employing antennas of a first polarization for wireless communications between base stations and customer wireless transceiver sites in first selected ones of said cells and employing antennas of a second polarization, different from said first polarization, for wireless communications between base stations and customer wireless transceiver sites in second selected ones of said cells.

3. A method according to claim 1, wherein said first and second polarizations are mutually orthogonal linear polarizations.

4. A method according to claim 1, wherein said first and second polarizations are mutually orthogonal circular polarizations.

5. A wireless local loop communication network comprising:

an arrangement of cells, each of which contains a base station, an omnidirectional antenna, and wireless transceiver equipment operative with a multiple frequency reuse factor, and that serves a plurality of fixed customer wireless transceiver sites, said fixed customer wireless transceiver sites being geographically dispersed relative to said base station and communicating with said base station using a prescribed communication signal polarization therebetween, said base station being arranged to interface customer calls with a public telephone switch network (PTSN); and a distribution of polarization diversity antennas among said base station wireless transceiver equipments, and wherein communication frequency reuse and polarization diversity antennas distributed among respective cells of said network are such as to satisfy a prescribed caller to interference ratio (C/I) criterion, wherein said distribution of polarization diversity antennas includes first antennas of only a first polarization for wireless communications between base stations and customer wireless transceiver sites in non-contiguous first selected ones of said cells and second antennas of only a second polarization for wireless communications between base stations and customer wireless transceiver sites in non-contiguous second selected ones of said cells wherein said first and second antennas of respective first and second polarizations are separated by a row of cells having a different channel frequency allocation.

6. A wireless local loop communication network according to claim 5, wherein said first and second polarizations are mutually orthogonal linear polarizations.

7. A wireless local loop communication network according to claim 5, wherein said first and second polarizations are mutually orthogonal circular polarizations.

8. A wireless local loop communication network according to claim 5, wherein first antennas of said distribution have a first polarization for wireless communications between base stations and customer wireless transceiver sites and are provided in first selected rows of said cells, and second antennas of said distribution have a second polarization, different from said first polarization, for wireless communications between base stations and customer wireless transceiver sites and are provided in second selected rows of said cells, between said first rows of said cells.

* * * * *